(12) United States Patent
Summersgill et al.

(10) Patent No.: US 8,697,236 B2
(45) Date of Patent: Apr. 15, 2014

(54) FINE LINE BONDING AND/OR SEALING SYSTEM AND METHOD

(75) Inventors: Philip Summersgill, Redcar (GB); Timothy George Ryan, Middlesbrough (GB)

(73) Assignee: Epigem Limited, Redcar (GB)

( * ) Notice: Subject to any disclaimer, the term of this patent is extended or adjusted under 35 U.S.C. 154(b) by 971 days.

(21) Appl. No.: 12/086,223

(22) PCT Filed: Dec. 6, 2006

(86) PCT No.: PCT/GB2006/004569
§ 371 (c)(1), (2), (4) Date: Jun. 5, 2008

(87) PCT Pub. No.: WO2007/066110
PCT Pub. Date: Jun. 14, 2007

(65) Prior Publication Data
US 2009/0081464 A1 Mar. 26, 2009

(30) Foreign Application Priority Data
Dec. 6, 2005 (GB) .................................. 0524854.7

(51) Int. Cl.
*B32B 9/04* (2006.01)
*B29C 51/00* (2006.01)

(52) U.S. Cl.
USPC ........................................ 428/411.1; 264/239

(58) Field of Classification Search
None
See application file for complete search history.

(56) References Cited

U.S. PATENT DOCUMENTS

| 5,443,890 A * | 8/1995 | Ohman ........................ 428/167 |
| 2003/0017305 A1* | 1/2003 | Roitman et al. ............... 428/156 |
| 2003/0176617 A1* | 9/2003 | Shen ............................... 528/44 |
| 2005/0255003 A1* | 11/2005 | Summersgill et al. ......... 422/100 |

FOREIGN PATENT DOCUMENTS

| DE | 19632275 | * | 2/1998 |
| WO | WO2004022233 | * | 3/2004 |

OTHER PUBLICATIONS

Hoehn, DE 1962275 machine translation, Feb. 12, 1998.*
MacMillan Dictionary: Seal, http://www.macmillandictionary.com/dictionary/american/seal_9 . Retrieved on Mar. 23, 2012.*

* cited by examiner

*Primary Examiner* — Callie Shosho
*Assistant Examiner* — Coris Fung
(74) *Attorney, Agent, or Firm* — Galgano & Associates, PLLC; Thomas M. Galgano; Jessica G. Bower

(57) ABSTRACT

A method of providing a fine line adhesive bond and/or seal or gasket and/or lined channel, and in particular a fine line bonding seal, between a first (14) and a second ply (16), especially of dissimilar materials, comprises the steps of: fabricating a microscale recess in at least a first ply; lidding the first ply with a second ply such that the recess or recesses in the ply or plies form a fluidly continuous channel (12), —urging curable material into this channel so as to substantially fill the channel with curable material, and in particular urging the material via an inlet (17) into a fluidly continuous channel until it emerges from an outlet (18) remote therefrom; curing the curable material in situ. A system for implementing the method and the bonded and/or sealed and/or lined product of such method are also described.

7 Claims, 6 Drawing Sheets

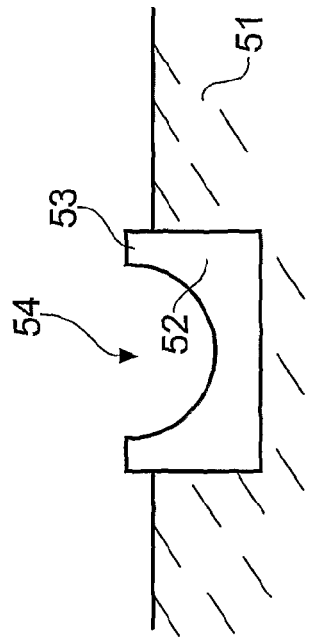
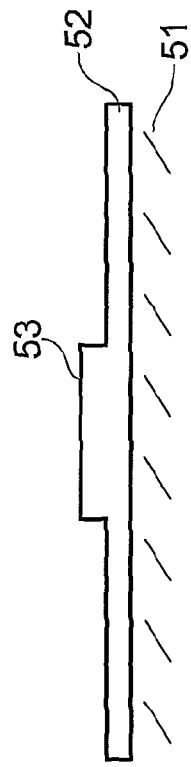
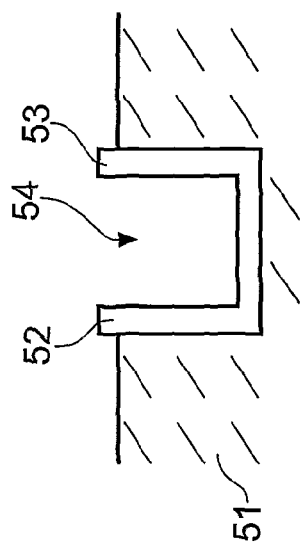
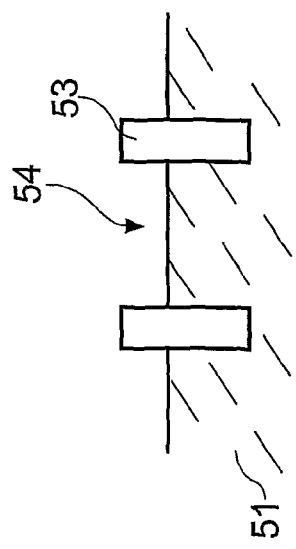
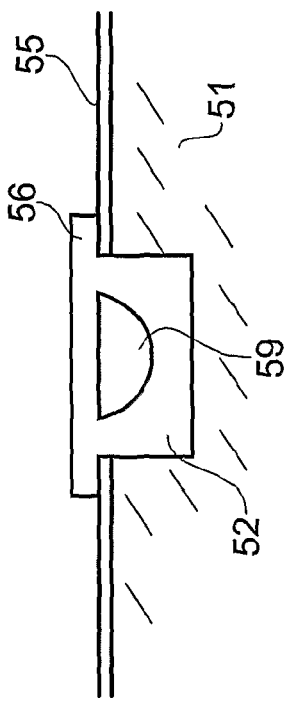
Fig. 6a
Fig. 6b
Fig. 6c
Fig. 6d
Fig. 6e

FINE LINE BONDING AND/OR SEALING SYSTEM AND METHOD

The invention relates to a method of bonding and/or sealing and/or lining, to a system for implementing the method, and to the bonded and/or sealed and/or lined product of such method. The method relates in particular to the use of a microfluidic method of fine-line bonding and/or sealing or lining by provision of a microgasket between two plies, especially of dissimilar materials. The method is in particular a method of fine line bonding/sealing on a microscale between two such plies, for example as applied in a microfluidic system or for production of microfluidic devices.

The problem of providing an effective bond or gasket or channel lining in a layers of material and especially between two layers of material, and in particular an effective sealing bond, between two layers of material arises widely over a range of applications, materials and fabrication scales. In particular it might be desirable to make a seal or bond to prevent undesired leakage of gases or liquids at the bond or seal interface and/or to make a channel lining to achieve material properties that are not available from the channel walls being lined.

This is especially an issue for dissimilar materials with dissimilar properties, and for example dissimilar thermal expansion properties. A variety of solutions have been proposed. In some instances, for example, it can be desirable to avoid inserting an additional layer, for example of adhesive, between the plies and/or to ensure that a seal or gasket is precisely shaped and located. To this end, a possible solution could involve the formation of a groove in one or both of the plies, for example a groove in a first ply to be lidded by a second ply, or a partial groove in both plies which forms a complete groove for receiving a sealing member when the first ply is lidded by the second ply in suitable orientation. Grooves may for example be machined in the ply, or moulded in the ply at the time of fabrication, using conventional fabrication techniques.

The groove or grooves form a recess for receiving a sealing means, such as an 'O' ring or the like, which has been separately fabricated. To provide an effective seal between the two plies, the 'O' ring or like means is located within the recess defined by the groove or grooves with the two plies brought together in the correct orientation. The two plies may be fixed together in a suitable manner, and for example may be adhesively bonded together, and in particular the sealing means may be adhesively bonded in situ within the recess.

Such a pre-fabricated sealing means is an effective solution in many instances. However, as the scale is reduced, and a requirement arises for microscale sealing, for example to provide a microscale bond or microgasket, in a microfluidic device or the like separately fabricated seals become increasingly less practical. Not only are such microscale seals difficult to pre-fabricate, they are also then difficult to manipulate and difficult to locate accurately in the micro recesses which need to be provided, and the process can become prohibitively expensive. In addition, the techniques used to provide the grooves in the ply or plies on a larger scale do not readily scale down either.

The invention is directed at the provision of an alternative solution which is more practical at a microscale, where a fine line bond/seal is required, for example on a scale where the recess to be sealed has a width of less than 1 mm, and in particular of less than 0.5 mm and/or a depth of less than 0.5 mm and in particular of less than 0.2 mm where prior art techniques are severely constrained if not impossible.

It is a particular preferred object of the invention to facilitate provision of a bond between two plies where it is desirable not to provide a gap for any adhesive between the plies and/or where one or both plies are of a material that makes other bonding systems inappropriate.

It is a particular preferred object of the invention to facilitate provision of a seal or gasket in a first ply, to form an effective seal when the first ply is in sealing contact with a second ply, which can be fabricated in situ and is thus particularly suitable for small scale and/or complex shaped applications.

It is a particular preferred object of the invention to provide a bonding/sealing system and method which is conveniently applicable to microfluidic systems, readily employable as part of the existing fabrication process for such systems, and for example is appropriate to isolate adjacent features in a microfluidic circuit.

Thus, in accordance with the invention in a first aspect, a method of providing a fine line adhesive bond (B) and/or seal (S) or gasket and/or lined (L) channel (also referred to hereinafter as a BSL inclusion or inclusion) and in particular a fine line bonding seal, between a first and a second ply, especially of dissimilar materials, comprises the steps of: fabricating a recess in at least a first ply; lidding the first ply with a second ply such that the recess or recesses in the ply or plies form a fluidly continuous channel; urging curable material into this channel so as to substantially fill the channel with curable material, and in particular urging the material via an inlet and feed channel into a fluidly continuous channel until it emerges from an exit channel and outlet remote therefrom; curing the curable material in situ to form the BSL inclusion in situ in the channel.

The fluidly continuous channel is created on a microscale, each recess being fine line with a width of less than 0.5 mm and for example in the range 1 to 500 µm and for example 5 to 500 µm and/or a depth of less than 0.5 mm and preferably less than 0.2 mm. The fluidly continuous channels, and the recess (es) forming them, may be of any shape in cross section including, without limitation, rectangular, square or circular or semicircular. The minimum gap or ridge between the microfluidic sealing channel and the channel carrying the liquid or gas in the use of the device might be in the range 5 to 50 µm. These minimum dimensions would be difficult to achieve "conventionally".

Optimum dimensions may vary between bonding and sealing applications. In the case of a bond it is likely to be desirable to make the width as large as practical and the depth a minimum of 15-25 µm. In the case of the seal it is the height of the protruding gasket that is important. A similar minimum of the order 20 µm might be appropriate but the depth of the seal in the channel might preferably be relatively deep unless otherwise anchored (for example, by feed/exit channels—see below). A depth of up to 500 µm (0.5 mm) can be contemplated. The width of a seal should be less than 0.5 mm. Feed holes are in the diameter range 50 to 700 µm, typically around 200 µm.

The recess in at least the first ply is conveniently created by a suitable fine line technique such as will be familiar from microfluidic technology. In other words, the recess is formed in the manner of a microfluidic channel. The recess is formed in at least the first ply initially as an open recess structure that when closed with a lid (that is, with the second ply) forms a channel either alone or in conjunction with a complementary recess or other structure such as a mould projection structure in the second ply. Once the channels so formed are filled they become inclusions that are either bonds, seals or linings as above defined.

The fluidly continuous channel may further include or be in fluid communication with additional horizontal and vertical channels, the latter also referred to as holes or vias, and/or feed channels/exit channels as above described, together making up a fluidly continuous path for the insertion of curable material at an inlet and feed channel. The exit channel and outlet allows for expelling air from the fluidly continuous channel as well as providing a visual indication that the channel has been filled by curable material.

These additional connecting channels (ie feed and exit channels/holes or vias) making up the fluidly continuous path may be fabricated as above (as open structures converted to channels via lidding) but will more usually be formed directly as closed channel structures within or through a single ply. In particular, feed/exit channels such as feed/exit holes are fabricated in or through a ply to complete a fluidly continuous path between an inlet and an outlet via a fluidly continuous channel fabricated in the above manner as a lidded recess in at least one ply. Feed holes are conveniently in the diameter range 50 to 700 µm, typically around 200 µm.

The expression microfluidic channel will be understood to define or describe a channel dimensioned for a microfluidic application. Microfluidic channel forming techniques suitable for use in the present invention in all materials (e.g. polymers, metals silicon, glass and ceramics) include precision machining, precision ablation using lasers etc (but could include nanoparticle ablation powders), lithographic etching such as photochemical etching and micro-moulding methods including injection moulding, casting, embossing including reaction forming such as photochemical curing, imprinting etc. Mechanical methods such as drilling, for example for through holes or vias or feed or exit channels, especially fabricated directly as closed channels in or through a single ply, and milling for large microfluidic channels might also be employed.

International Patent Publication WO2004/022233 illustrates a microfluidic system which might be of relevance here, both as a general illustration of microfluidic channel forming and as a possible application of the present invention, comprising a three dimensional sealing microfluidic network as described herein in combination with the three dimensional use network such as described in WO2004/022233.

The fluidly continuous channel thus preferably includes one or more channel sections intended to serve a microfluidic or like function in a device together with connecting channels within the structure for example comprising vias as above and/or feed/exit channels at the inlet and outlet. These connecting channels can be advantageous for a number of reasons.

The connecting channels when filled with cured sealant can form "plugs" or "anchors" that will aid retention of the bond/seal/lining materials in the supporting substrate. The distribution of feed and exit channels or holes is likely to be particularly important in the case of embodiments where the method is used to produce gasket or sealing and lining materials as on the whole they tend not to provide good adhesion to the channels walls as they are designed to provide non-stick reversible seals.

WO2004/022233 refers to complex microfluidic systems. From this can be visualised applications of the invention in its most complex form and this highlights another benefit of the feed channels in managing the input and output of materials in general. This is a problem common to the provision of services in any structure i.e plumbing, electricity, telecoms etc.

The use of multiple inlets and outlets and associated feed channels enable a range of materials to be microfluidically processed during fabrication and use, for example, electrophoretic gels, meltable paraffin valves and pneumatic control gases, as well as liquid samples and reagents for synthetic and analytical purposes.

The feed channels to the seals, bonds and linings allow the inlets to be positioned anywhere on the supporting substrate for examples on the same side, the edge or opposite side of the seals retaining substrate.

The benefits of the invention include a means of fabricating "hybrid" or composite structures combining materials from gases, liquids, gels to soft elastomers or rubbers through to hard polymers (filled and unfilled) and inorganic glasses and silicon and metals and ceramics The use of multiple inlets and feed channels enables different sections of a microfluidic circuits to be lined or not lined giving linings with different wetting characteristics or surface chemistries or catalytic properties including metal coatings formed by feeding solutions for electroless metal plating. Or for creating plies that are bonded and elsewhere plies for demountably sealing to a removable substrate.

In accordance with the invention the curable material is curable in situ within the channel such as to form a BSL inclusion such as an adhesive bond and/or gasket or other seal and/or channel lining. Because the adhesive bond and/or seal forms in situ, the scale is limited only by the process used to create the recess. The BSL inclusion can be formed very accurately as part of the fabrication process for fine line devices such as microfluidic devices.

There is no requirement for the fabrication and handling of microscale pre-fabricated sealing means, such as microscale 'O' rings. Forming the seal and/or bond and/or lining instead in situ is much more practical at the sort of microscales to which the invention relates, cheaper and more reliable.

The method of the invention lends itself both in a first alternative to the provision of adhesive bonds, in which an adhesive is introduced into the channel between the two plies to be cured in situ to effect an adhesive bond, and in particular a sealing adhesive bond, between the two plies, and in a second alternative to the provision of a non-bonding seal or gasket in at least the first ply.

In the first alternative of the method, it is evidently apparent that the intended finished product will include the first and second plies adhesively bonded and optionally also sealed together by means of the method of the invention for example in that the plies are composed as part of a microfluidic device. In accordance with the second alternative of the method, a seal or gasket and/or lining is disposed within the channel defined by the recesses in the first and second plies, or in at least the first ply. The seal or gasket and/or lining does not necessarily constitute a bonding seal, and materials for the curable composition may be selected relative to materials for the plies in relation to sealing properties rather than adhesive properties.

In accordance with this second alternative in a first optional configuration, the resultant device may include the first and second plies, with the seal or gasket produced in accordance with the method being disposed therebetween to serve as a suitable seal or gasket and/or to line the channel in at least one of the plies, for example in that the plies are composed as part of a microfluidic device. However, in this second alternative the method is not so limited. In a second optional configuration of this second alternative, the resultant device may constitute a seal or gasket provided in accordance with principles of the method of the invention in just one of the plies, designed for use with the other ply removed, and with the seal serving as a seal between the first base ply and an additional substrate in registration with the base ply and brought into contact against the seal to effect a sealing engagement.

In this option, a base ply, for example the first ply, comprises a part of the eventual device, but the other ply, for example the second ply, comprises a mould which is removable to leave a seal or gasket and/or channel lining in situ in the first ply. To effect this option, in an embodiment of the method, the method is a method of forming a seal or gasket and/or lined recess in situ in one of the plies, and comprises the above description basic method with the additional steps of: separating the two plies so as to leave a seal or gasket and/or lining in situ within a recess formed in one of the plies, and optionally thereafter forming a product by bringing that ply into contact with a secondary substrate such that the seal or gasket effects a seal between the ply and the said secondary substrate.

In accordance with this preferred embodiment of the method, the basic method is used to form a preform, with the base ply and seal intended to form part of the final device, but the upper ply serving as a removable mould. This has particular advantages, especially in relation to certain microfluidic and like devices. Because sealing and/or lining structures are created in situ in the first ply, the secondary substrate, which serves to lid the first ply to provide a final device, can be applied purely mechanically, for example by being brought into intimate sealing engagement with the sealing structures in the first ply. This offers significant advantages in certain circumstances when compared with applying a lidding ply by a thermal process. For microfluidic applications, it might be desirable to provide, within what will ultimately be sealed channels or areas within the microfluidic device, areas of particular activity, for example particular chemical or biochemical activity. Such principles will be well known to the skilled person, who will also appreciate that many such active areas are particularly thermally sensitive, and could be damaged by excess heating.

It is a particular advantage of this method as a method of fabrication of such devices that it allows, in accordance with the specific refinement of this embodiment, for areas of particular chemical or biochemical or like activity to be provided on the surface of the substrate of the base ply, for example in channels or areas defined by the seals produced therein, after moulding of the seals and removal of the mould ply, but prior to lidding with a secondary substrate. Thus, such active areas may be provided after any thermal processing has been completed, and when only a mechanical lidding operation remains, so that even thermally sensitive active areas will not be damaged by the final stage of fabrication.

In accordance with this preferred embodiment of the method, the removable ply surface serves as mould surface which is not present in the final device. Accordingly, it can be used to impart structure into the seal or gasket to add functionality to the seal or gasket in the final device. For example, the ply serving as a mould surface may incorporate structural features designed to operate in conjunction with a substantially planar surface of, or complementary structural features on the surface of, the secondary substrate in the final device.

In accordance with this preferred embodiment of the method one of the plies is a mould surface for creating structural features in a seal to be formed in the other ply. For example the mould surface might be a microrelief element described in Patent publication WO96/35971 together with methods of making a flexible mould tool.

For example, in one possible embodiment the mould surface incorporates projections in registration with and projecting into so as partially to fill, when the plies are brought together as the method is practised in use, the volume of the recesses in the base plies, such that the resultant seal is formed as a lining of the recess in the base ply with a channel means therein. Such a structure might have a wide range of applications. For example, it might in effect enable a user to create a microfluidic seal and a microfluidic channel simultaneously. The use of multiple inlets and channel feeds would enable different sections of a microfluidic circuit to be lined or not lined or different sections lined with more than one type of material giving for example sections with different wetting characteristics or surface chemistries or surface coatings.

Additionally or alternatively, a mould surface might include recesses in registration with the recesses in the base ply or parts thereof, so that in the vicinity of these recesses in the mould surface when the plies are brought together as the method is practised in use, the resultant seal projects above the surface of the base ply. A variety of structures can be created in this manner, in particular projecting seal structures which can be brought into engaging contact with the surface of a secondary substrate in a final device, for example for microfluidic applications.

In accordance with this aspect of the method, where one of the plies is a mould surface to create structure in the seal created in the other ply, a wide variety of very small scale structure devices can be envisaged, including for example devices in which the moulded seal forms an engaging seal to a second surface creating a sealed channel or chamber or similar contained volume, devices in which the moulded seal itself forms one or more containment surfaces, devices in which the moulded seal can be deformed to constrict or control flow of fluid within a channel, and other devices for a range of microfluidic and other applications.

In one possible alternative embodiment of the method the mould surface may comprise part of flexible mould tool that is left in association with the base ply until the point of use, and thus serves as a protective film, for example to keep the seal structure clean prior to removal and use of the base ply in conjunction with a suitable secondary substrate at a point of use.

A device thus comprises at least one ply formed in accordance with the foregoing method, in contact with a suitable secondary substrate in use.

A device may comprise two plies formed in accordance with the foregoing method. That is to say, the said secondary substrate is also a base ply as above in which a sealing structure has been moulded in accordance with the method, the formation of the device comprising the steps of forming a sealing structure in a first base ply by applying a mould surface as above described, forming a sealing structure in a second base ply by applying a mould surface in the manner above described, removing the two said mould surfaces, and bringing the two base plies together. The method of the invention will allow various complex complementary and co-operable structures to be built in the two seals as required.

In accordance with all alternatives, the curable material is any material curable in situ via any suitable curing means from a suitable fluid precursor. For example, it may be thermally curable, light curable and in particular UV curable, or chemically curable relatively or by catalysis or otherwise adapted to cure in situ over time.

Precise material selection will be determined by the material of the ply or plies in which or between which the seal, gasket or bond or lining is intended to be created in use. It will also tend to depend on whether the intended application is to create a permanent bond between the first and the second plies or to create a seal or gasket between the first and second plies, or to create a seal or gasket or lining in a first ply from which the second can be removed after serving as a mould allowing the first ply to be used with an additional substrate. Clearly, highly adhesive properties are required where an adhesive application is envisaged, and relatively less adhesive properties are required where the priority is sealing, and particularly so between a curable material and a ply where the intention of the method is that the ply is to be removed prior to use having served as a mould surface, for example, applications where the device is to be used with a disposable substrate that has been substituted for the protective mould surface.

In general however, suitable materials will include various curable fluids, where the single component or multiple constituent, which can be cured in situ, in particular liquid adhesives and curable liquid rubbers such as silicone and/or fluorine containing rubbers, UV curable rubbers, polyurethanes, acrylates and the like. Systems based on siloxanes are particularly preferred.

The curable material is urged into the channel either via an extrusive/pumping force at an inlet, or by application of a suction force at an outlet, or by some combination thereof. Substantial fill is usually proven by monitoring the escape of curable material from an outlet, provided the outlet is suitably located.

The fluid channel forms at least a bonding/sealing and/or lining channel zone at the interface of the two plies when correctly assembled. The two plies together define the shape of the BSL inclusion which is formed in the channel zone. At least one inlet and at least one outlet are conveniently provided into which curable material can enter and exit. Additional channel means, fluidly continuous with the bonding or sealing zone channel may serve as inlet and/or outlet channels linking an inlet and/or outlet point remote from the primary bonding or sealing zone and/or may serve as link channels to link a plurality of bonding or sealing zones to each other in fluidly continuous manner to allow the simultaneous creation of multiple fine line bonds and/or seals between the plies and/or in the first ply. Such inlet, outlet or linking channels may be in any suitable orientation within a ply, for example being formed to pass laterally along the ply surface, through the thickness of the ply, or in some suitable combination thereof or other suitable orientation.

The method is described at its most basic is used in the bonding of and/or sealing between two plies, and in particular two plies of dissimilar material. In this simplest alternative, the two plies may form the two plies of the final device. For example, for microfluidic applications, it might be desirable to bond and/or seal a quartz ply to a ply of polymeric material, the quartz ply serving as a window. Of course, the principles of the invention can be readily extended to the simultaneous or successive bonding/sealing of a larger plurality of plies. In one alternative, separate channels are created at the interface each pair of successive plies. In another alternative, a fluidly continuous channel comprising a plurality of bonding/sealing channel zones at the interface of a plurality of pairs of plies fluidly linked into a single continuous channel by linking channel means through the thickness of the plies may allow a multiple plurality of plies to be bonded/sealingly bonded simultaneously.

In the alternative, one ply serves as a mould and is removed in an additional optional method step, with the seal and/or lining being left in situ in the other ply which is then brought into contact with an additional substrate in the final device. In this alternative, the mould ply can be of any material suitable for the mould application when used in conjunction with the base ply, and a seal can be generated in the base ply which can be useful in conjunction with any dissimilar secondary substrate, but in a sealing rather than a bonding application.

During insertion of the curable material and/or during cure the plies are preferably urged into more intimate and consistent contact by application of a suitable urging force. This may for example be by pressure from outside, via a clamping system or the like, or by the creation of an internal vacuum in a separate channel or other feature between the plies, or by other suitable means. Similarly, in the alternative where a final device is formed by first forming a seal in a base ply and then bringing a secondary substrate into sealing contact therewith, the base ply and substrate are urged together in like manner to form a device in use.

A typical channel is 0.4 mm wide and 0.1 mm deep. The channel may be open, as in the first example hereinbelow, or form a fluidly continuous closed loop, as in the second example hereinbelow.

Using microfluidic techniques to fabricate the channel allows small, accurate and intricate channels to be readily formed, and consequently small, accurate and intricate bonds and/or seals to be created in situ between the two plies and/or fine structured seals to be created in one of the plies.

The invention is particularly suited to the fine-line bonding of two plies, in particular of materials which are dissimilar or otherwise difficult to bond effectively by other methods. In this case, the curable material is a curable adhesive. For example, if channels are formed in a non-stick material, the bonding will bond the top ply directly to the base ply. The system is also useful when bond strength between the material of the ply in which a channel is formed and the material of a base ply is weak. Fine line bonding can be used to bond together plies with difficult surface profiles, and for example to bond cylindrical surfaces.

In accordance with a further aspect of the invention there is provided a bonded and/or sealed and/or lined product which comprises at least two plies at least one of which has been provided with a bond and/or seal and/or channel lining (ie a BSL inclusion) in accordance with the foregoing process.

The product preferably comprises a plurality of channel portions having an activity such as a microfluidic activity (that is, a plurality of microfluidic channel portions) fluidly linked into at least one fluidly continuous channel as defined in the context of the invention, for example, via fluid feed channels and having at least one inlet feed channel and at least one exit channel, with BSL inclusion structures formed therein by curing of the curable material.

It will be appreciated that the method of invention can be used to produce useful products which fall into three basic categories. In the first category, the first and second plies together form the device in use, with a bond and/or seal being created in situ between them in accordance with the method. In the second category, the second ply is a removable mould, and the device is a preform comprising the first ply, seal in situ, and mould ply left in situ. In the third category a preform of the second category has had the mould ply removed, and a device formed by bringing the base ply into intimate sealing contact with the secondary substrate. Of course, complex devices having multiple plies and/or multiple components may combine more than one of the above device principles.

Thus in a first alternative, a structure is provided comprising at least two plies, wherein a seal and/or bond is effected between the two plies in that a sealing channel is provided at the interface between the plies by provision of a recess as hereinbefore described fabricated in the surface of at least one of the plies, the said sealing channel being substantially filled by cured material as above described, and in particular by cured adhesive which may additionally have a sealing function.

In a second alternative a structure is provided comprising at least two plies wherein a seal and/or channel lining is created in situ in at least one of the plies in that a sealing channel is providing at the interface between the plies by provision of a recess as hereinbefore described fabricated in the surface of at least a first, base ply, the said sealing channel being substantially filled by cured material cured as above described in situ, with the second ply remaining removably in situ having served to complete the mould volume during fabrication.

In a third alternative a structure is provided comprising a first, base ply provided with a recess at least partly defining a sealing channel in which a seal and/or channel lining has been moulded in situ in the manner above described, and from which the mould ply has been removed, and a secondary substrate in sealing contact with the base ply.

The recess is formed in the manner of a microfluidic channel as above described, initially as an open recess in at least one ply, closed to form the fluidly continuous channel by lidding with the other ply, preferably by a non-mechanical process, for example involving application of light to fine line precisions, such processes including laser ablating or etching methods.

A plurality of such seals/bonds/linings may be provided between each ply in an adjacent pair and/or the product may comprise multiple plies, a plurality of pairs of adjacent such plies being provided with such seals/bonds/linings. Where a product has multiple seals/bonds/linings the channels into which these are formed may be fluidly separate, or may be fluidly linked, allowing multiple such seals/bonds/linings to be formed simultaneously in the manner above described.

The product is preferably a microfluidic device in that the bonded/sealed structure preferably includes microfluidicly active areas or structures serving as microfluidic formations, for example within regions defined by seals in accordance with the invention, to form a microfluidic device. As used herein, a microfluidic formation may comprise any known element of a microfluidic system, including without limitation an active device unit, such as a reactor, heater, cooler, analyser, detector, mixer, processor, separator or the like, a fluid function unit such as a pump, valve, filter or the like or merely a fluid channel, chamber or manifold to complete a particular microfluidic circuit. Multiple formations with multiple activities may be provided in a device.

In particular, each formation preferably has a generally planar sandwich construction with the two plies or bas ply/substrate as above described defining the sandwich layers and the seal or seals therein in accordance with the invention defining a fluid channel and/or chamber portion. Thus, in a preferred embodiment the device comprises at least one sandwich layer defining in conjunction with at least one seal at least one enclosed fluid channel and/or chamber portion with microfluidic functionality.

Active microfluidic elements may be incorporated within the channels and/or chambers so formed in the sandwich layer or additionally or alternatively may be provided upon the surface of a base ply in fluid communication with the fluidly continuous channel therewithin. In a complete device, one or more inlet and/or outlet apertures and their associated feed and exit channels to the seal/bond/lining and/or other linking channels such as holes or vias are preferably provided within the sandwich structure to effect a fluid communication into and out of and through the device. Feed and exit channels and other linking channels such as holes or vias may conveniently comprise closed channels formed directly in or through a single ply, and for example comprising holes through or along the thickness thereof. Such linking channels may be formed via a mechanical process, such as drilling of through holes or vias.

Layers or materials which contact fluid in use are preferably fabricated when necessary from chemically resistant plastics material, such as epoxy, a photoimagable epoxy being most preferred, or provided with chemically resistant thin film surface laminates. Suitable resistant thin film laminate materials might include epoxy glued PEN laminates. This gives good resistance with good fabricability of fluid channels and chambers. In sandwich structures, cover layers including fluid inlet/outlet ports which might also contact fluid in use are also preferably fabricated from materials exhibiting good chemical resistance, for example epoxy or other plastics such as polyetheretherketone (PEEK). Alternatively, materials may be given a suitably resistant coating in such areas.

Additionally, any materials or layers might also be modified for specific properties, for example for transparency, for electrical, magnetic or dielectric properties, to provide mountings for externally mounted microfluidic device components etc. Metallic layers may be provided or incorporated, for example to serve as a conductor, resistive heater or otherwise.

In practice, different parts of individual components might have different functional requirements, for example regarding transparency, structural strength, chemical resistance etc. Combinations of materials may be used for a ply/substrate in accordance with the invention.

For example, in the case of a microchemical reactor it is beneficial to use a substrate polymer that is optically transparent to enable easy inspection of the fluid path and/or to allow measurements and/or is thermally transparent or transparent at other wavelengths for any purpose. It will be understood however that a readily available polymer with good transparency that is also resistant to a wide range of solvents used in synthetic chemistry is not generally available. By adopting a composite approach a substrate ply can be readily formed comprising a composite structure having areas of a transparent material (not necessarily exhibiting high chemical resistance) where required, and areas of a chemically resistant material (not necessarily exhibiting high transparency) at least in regions where solvent contact is possible, preventing contact with the less resistant transparent substrate material. For example a basic structure comprises transparent material but in which inserts of chemically resistant material are included in the substrate in regions where solvent contact is possible. Alternatively a basic structure of chemically resistant material with "window" inserts of transparent material will serve the same purpose. Specific areas with other functionality will similarly readily suggest themselves.

As used herein, microfluidic will be understood to refer to microstructures having at least some sub-millimetre dimensions, microstructure in this case being used to refer to any of a variety of well known structures in such systems, including, but not limited to, the channels and chambers hereinabove described, that are capable of providing passage or storage for a fluid.

Other preferred features of the devices of the invention will be understood by analogy with the discussion of aspects of the process.

In accordance with a further aspect of the invention, an apparatus for carrying out the method as hereinbefore described comprises a means to create a recess in at least one ply as hereinbefore described, in particular in the manner of a microfluidic recess, a means to cause a pair of plies, at least one of which has such a recess, to be brought together such that the recess(es) forms a channel as hereinbefore described, a means for urging curable material into the channel so formed to substantially fill the same, and a means for curing the curable material in situ in the channel such as to form a seal and/or bond thereby.

In a preferred embodiment, the apparatus further comprises means to remove one ply from the other ply so as to leave cured material in situ in the said other ply as an in situ seal or gasket, and optionally further means to bring a secondary substrate into intimate contact with the said other ply so as to effect a sealing engagement therebetween via the seal or gasket and form a device.

Other preferred features of the product and apparatus will be understood by analogy with the described preferred features of the method.

BRIEF DESCRIPTION OF DRAWINGS

The invention will now be described by way of example only with reference to FIGS. 1 to 6 of the accompanying drawings, in which:

Referring to the figures, FIG. 1 shows a linear bond in plan view and in cross section. A microfluidic channel (12) which is shown filled with adhesive is created in a lower bonded ply (14), to effect a bond with an upper bonded ply (16). The bond channel is 0.4 mm wide and 0.1 mm deep, and is created by a suitable microfluidic or like technique as above described.

To create the bond, adhesive is injected via an adhesive entry hole (17) at one end of the channel, until such point as it exits from the exit hole (18) at the other end of the channel. This should guarantee a reasonably consistent fill. The adhesive is then cured to create a fine line bond between the plies, in this example by exposure to UV, although the particular curing system is not specifically pertinent to the invention.

Figure 1:
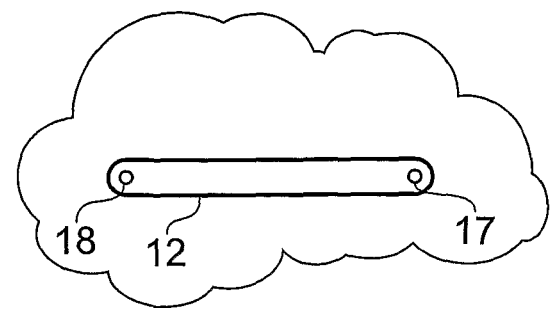
FIG. 1 is an example of a fine line bonding in accordance with the principles of the invention in which the channel is open.
Figure 1:
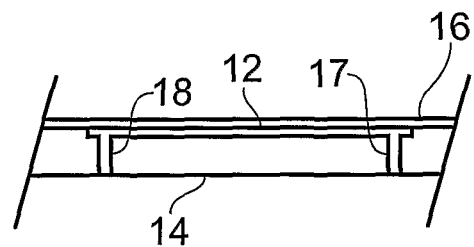
Figure 2:
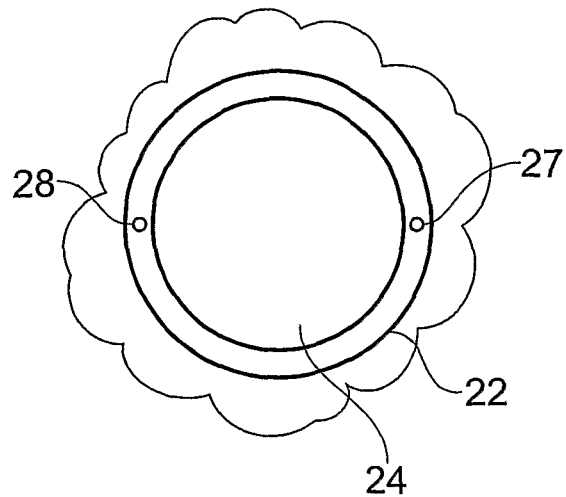
FIG. 2 is a similar fine line bond in accordance with the invention in which the adhesive channel is a closed loop.

FIG. 2 illustrates an equivalent system to FIG. 1 with an alternative geometry, in that the microfluidic channel (22) filled with adhesive forms a closed loop. This example creates an isolated central area (24) which may have microfluidic circuits or other features as desired. In this example, an adhesive entry hole (27) is disposed at one side of the circular channel loop, and an adhesive exit hole (28) is disposed remotely therefrom. Again, UV curable adhesive is injected into the entry hole until such point as it flows freely from the exit hole to suggest a reasonably consistent fill of the channel. The adhesive is then cured to complete a fine line bond.

Figure 3:
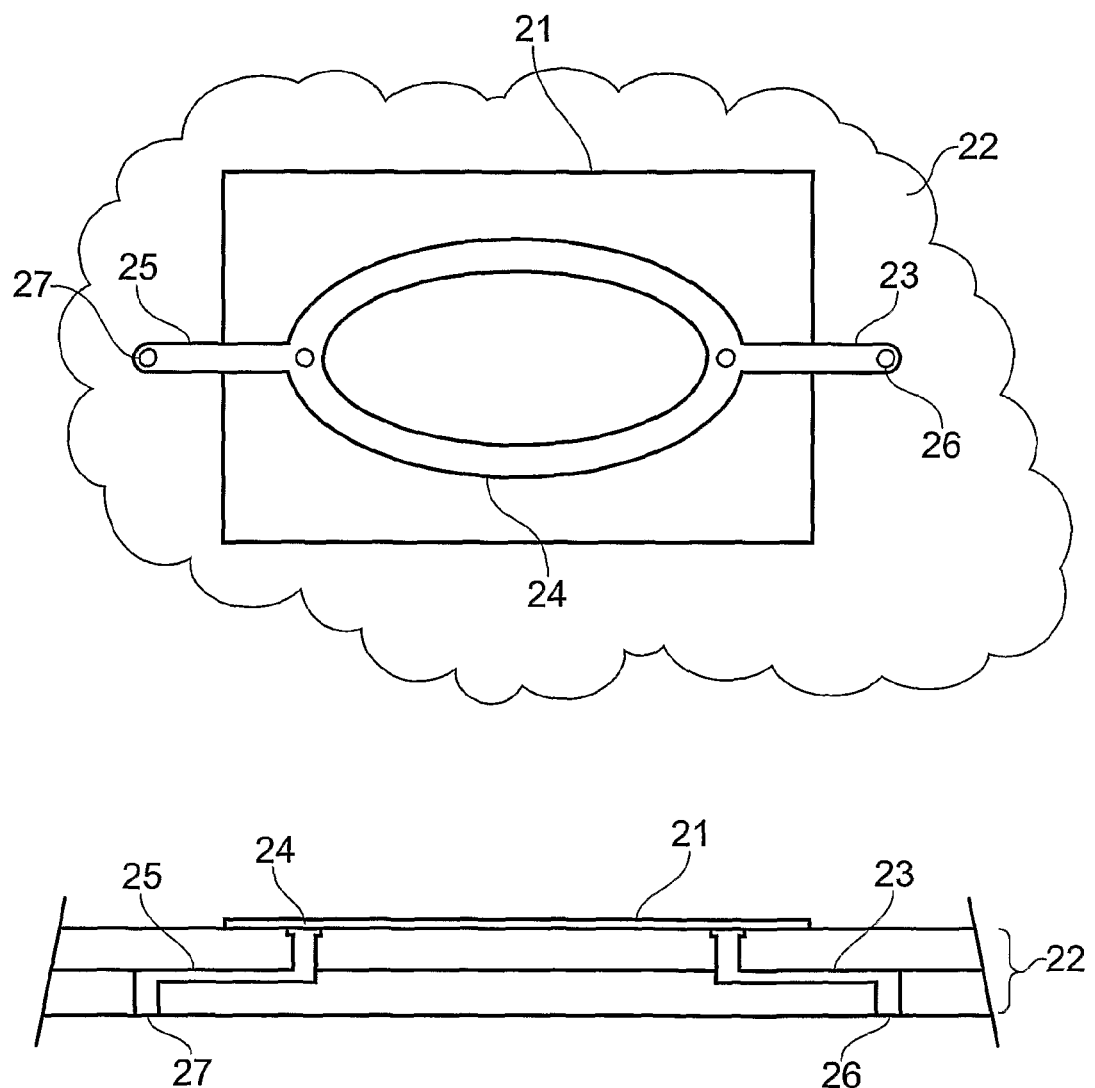
FIG. 3 is an example of adhesive bonding with a remote adhesive feed.

It can be desirable to provide a remote adhesive feed, for example to bond through multiple plies. An illustration of this is given in FIG. 3.

In the figure, a small rectangular top ply (21) is shown bonded to a base (23) comprising two further plies. The bonding is again a closed loop adhesive ring, geometrically similar to that in FIG. 2, comprising a suitable 0.4 mm wide, 0.1 mm deep channel formed within the upper surface of the base material using the microfluidic or like techniques already described. However, additional linking channels (23, 25) respectively link the adhesive ring (24) fluidly with an adhesive entry (26) and an adhesive exit (27).

To form a fine line bond, adhesive is fed remotely via the adhesive entry on the underside of the base, through the link channel into the adhesive ring, and then via the second link channel to the adhesive exit, again on the underside on the base. As before, as adhesive passes from the exit point, this gives a reasonable indication of substantial fill.

In accordance with this example, injection of adhesive is not limited to direct injection into the bonding channel zone itself, but can be injected remotely. For example as shown it might be desirable to inject adhesive from the underside of a base. In the alternative, it might be desirable to inject from the top side, but nevertheless remotely spaced. It will also be appreciated that the principle of linking channels could be used to allow adhesive to injected through the thickness of multiple plies and/or to link more than one adhesive ring or other structure fluidly, so that adhesive could be injected to create a plurality of fine line bonding zones simultaneously.

Figure 4:
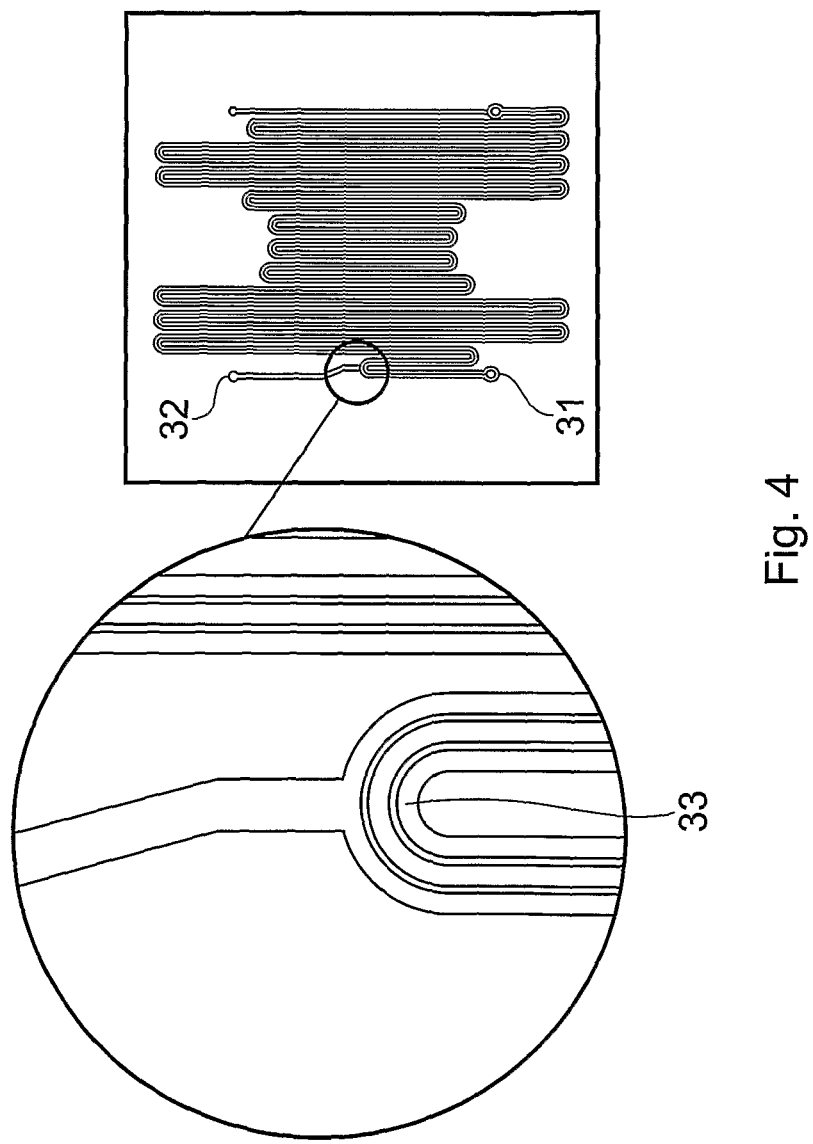
FIG. 4 is an example of a microfluidic channel with an almost sheathing gasket in accordance with the invention.

FIG. 4 illustrates an example of a gasket seal in accordance with the invention formed in situ. In such a case, the seal doesn't necessarily form a strong bond as in the case of silicon or fluorinated rubber sealants that start as flowable liquids before they are cured by a generally slow chemical cure but can also be photocured. The material is selected for its sealant properties.

As illustrated in the figure a fluid channel with inlet (31) and a gasket channel with inlet (32) are shown. The channels are in close proximity. The fluid channel transporting liquid/gas is at all times protected from leaking (regardless of circuit complexity) by the close proximity of an almost sheathing gasket 33 throughout its length.

FIG. 5 illustrates another microgasket seal, in this case providing with the clear intention that the gasket seal is created in a base plate by lidding with a ply which is intended to serve as a removable mould and also, prior to removal, as a protective layer for the formed seal and enclosed channels.

Figure 5A:
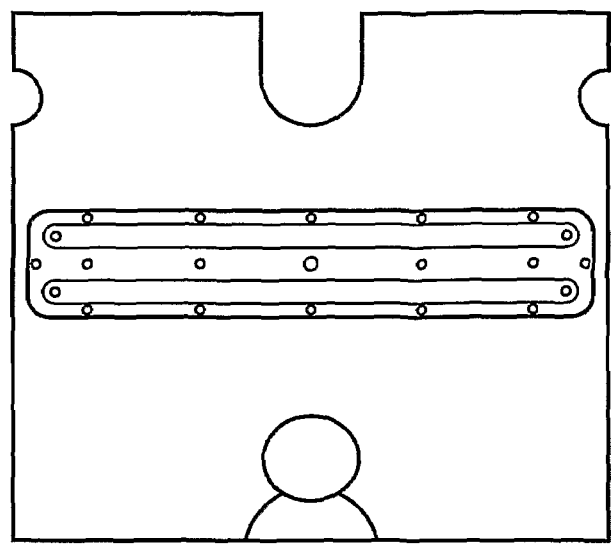
FIG. 5 is a plan view of a microgasket seal in accordance with the invention.

Referring to the Figures, a base plate in which the gasket is intended to sit is fabricated from 3 mm thick acrylic into which has been machined 0.5 mm wide and 0.5 mm deep grooves registered to alignment pin holes as shown in FIG. 5*a*. Vent holes and injection ports are drilled into the structure for PDMS injection again in registration with the alignment pin holes and therefore the machined grooves in FIG. 5*a*.

Figure 5B:
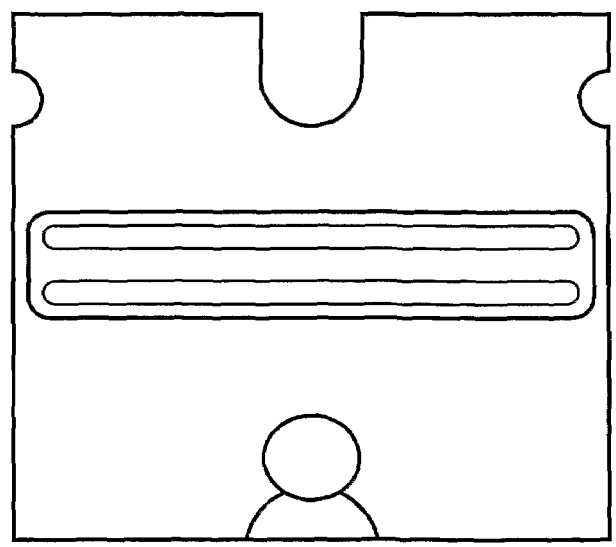

Referring to FIG. 5*b*, a part is fabricated that defines a microgasket protection layer/mould strip as shown in FIG. 5*b*. The microgasket profile is defined with lithography, in this case 0.5 mm wide and 50 µm deep defined in alignment with the grooves in FIG. 5*a*. The curable PDMS is injected into the channels created by bringing the structures in FIGS. 5*a* and 5*b* into alignment to create the microgasket within the channel. Because of the conformance of the channel, by virtue of the grooves in both surfaces, the gasket projects above the surface of the base layer.

In accordance with the intended use, the flexible mould surface layer is retained as a protection until immediately prior to use, having previously served to define the gasket structure itself. The service layer thus protects the protruding gasket and enclosed channels from contamination, damage, dust and the like. Immediately prior to use, the surface layer is removed and the base plate with sealing gasket brought into contact with a secondary substrate as desired to form a microfluidic device.

In accordance with a preferred method of fabrication as above described, one of the plies serves as a base ply in which a seal or gasket is created in situ, the other ply serving as a mould surface to develop structural features in the said seal or gasket, and in particular structural features which comprise recesses below or projections above the level of the surface of the base ply. A few examples of such structures, merely illustrative of the complexity that can be created and by no means intended to be exhaustive, are illustrated in FIG. 6.

In each of FIGS. 6a to 6e, illustrated in section, a base ply (51) is shown into which a seal (52) has been moulded in accordance with the method of invention. In each case the seal has been moulded by providing a suitable lidding ply as a mould surface (removed and not shown) with the lidding ply being so structured as to form the resultant structures out of the seal (52) by defining a channel which is completely filled by sealing material. Thus, although the mould surfaces are not shown, the skilled person will readily appreciate the shape of the channel therein by observing the shape of the resultant seal structure.

In example 6a a seal structure is shown in which the sealing material (52) lines a recess in the base layer (51) to define a channel (54). The seal also has portions (53) projecting above the level of the base layer (51). In such structure, when brought into contact with a suitable secondary substrate to form a microfluidic device, it can be seen that the seal (53) both serves to define and to seal closed a microfluidic channel.

A similar structure is shown in FIG. 6b with like numerals being used to define structures with like functionality. Again, projections (53) provide a seal around a channel (54) within a recess in the substrate (51). The only difference in this instance is in the shape.

A similarly functional alternative structure is illustrated in FIG. 6c. In this instance, a pair of recesses in the substrate (51) are provided with seals (53) which project above the surface of the substrate (51). Again these will define and seal a channel (54) in the final device.

In the alternative illustrated in FIG. 6d a sealing material (52) extends across a substrate surface (51) and is provided with a projecting portion (53).

FIG. 6e is an example of a device comprising two substrates prepared with seals in accordance with the invention which have been brought together in a complete device. A first substrate (51) has been provided with a seal in the manner illustrated in FIG. 6b. A second substrate (55) has a seal (56) provided in a simple recess. The two substrates are prepared in accordance with the method by lidding with a second ply which serves as a mould surface and removing the second ply to expose the seal in situ in the substrate. The two substrates are then brought together to provide the device illustrated in FIG. 6e, which defines a microfluidic channel (59) in convenient and precise manner.

Figure 6F:
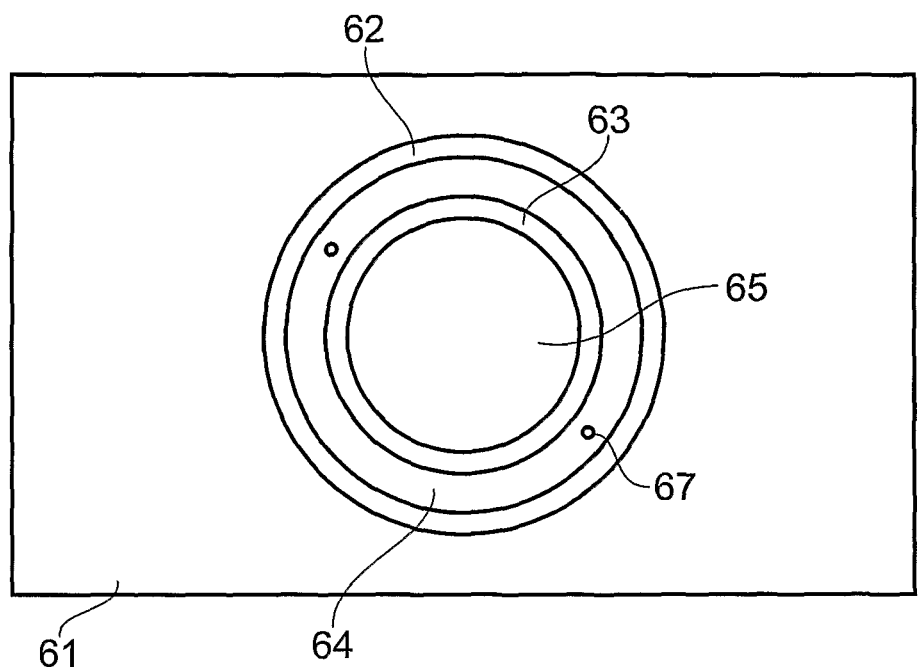
FIG. 6 illustrates examples of structural features in a base ply formed in accordance with the invention, shown in section (6*a-e*) and in plan view (6*f*).

In FIG. 6f a further alternative device is shown in plan, in effect comprising a pair of gaskets formed broadly in like manner (except in so far as they are gaskets rather than adhesive bonds) to the bonds in FIGS. 1 and 2. An outer gasket (62) and inner gasket (63) are formed in grooved structures via a moulding technique as above described in a base ply (61). The inner seal defines a contained volume (65), whilst the two concentric seals together define an annular volume (64). Again, the intention is for the device to be completed by provision of a secondary substrate in sealing engagement on top of the illustrated embodiment, for example being a flat plate. The secondary substrate is used to lid this embodiment to complete the device, isolating a working volume (65) and a fluidly separate annular region (64).

In addition to such inlet holes (not shown) as may be provided in the substrate (61) to provide for injection of curable material to fabricate the seals (62, 63), additional inlet holes (67) are drilled in the substrate (61) in such position as to lie in the annular region (64) once the seals have been formed. These holes are used to assist in the forming of an intimate sealing contact between the embodiment illustrated in FIG. 6f and the secondary substrate. The intention is that the volume (65) will serve as a fluidly isolated working area, for example for microfluidic application, whilst the volume (64) will be used to assist in the sealing process, and to urge the substrate (61) into a more intimate sealing engagement with the secondary substrate, by at least partial evacuation to create a pressure differential via the apertures (67). Such an embodiment provides a highly controllable seal. Levels of evacuation can be controlled to ensure that a consistent seal is maintained without the need for application of excessive external pressures.

Thus, in accordance with the invention, potentially complex structures, for example for microfluidic applications, can be created in situ, either in situ between two plies which are intended to form an element of the microfluidic device in use, or in situ in a first ply, the second ply serving as a mould surface to fabricate a pre-cursor to a component of the microfluidic device. Bonds, seals and gaskets on a microscale, in complex device structures, and incorporating complex internal structures, can be fabricated quickly and consistently.

The invention claimed is:

1. A microfluidic device structure, comprising:
   a first, base ply provided with at least one microscale recess fabricated in an upper surface thereof, said at least one microscale recess at least partly defining a sealing channel;
   at least one molded in situ member selected from the group consisting of a seal and a seal and channel lining, which is molded in situ in said sealing channel and projects above said upper surface of said base ply; and
   a secondary substrate having a lower surface in sealing contact with said at least one molded in situ member, said base ply and said secondary substrate defining sandwich layers, wherein said upper surface of said base ply is spaced apart from said lower surface of said secondary substrate, and wherein said at least one molded in situ member forms at least one containment surface and wherein said at least one molded in situ member, said upper surface of said base ply and said lower surface of said secondary substrate together define and seal closed a microfluidicly active volume therebetween with microfluidic functionality which volume is in the form of at least one member selected from the group consisting of a fluid channel, a chamber portion, and a fluid channel and chamber portion.

2. The structure according to claim 1, wherein:
   said at least one microscale recess has a width in a range of 5 to 500 µm.

3. The structure in accordance with claim 1, further comprising:
   at least one connecting channel selected from the group consisting of feed channels, exit channels, vias and holes.

4. The structure according to claim 3, wherein:
   said at least one connecting channel comprises closed channels formed directly in or through a single ply to complete a fluidly continuous path between an inlet and an outlet.

5. The structure according to claim 4, wherein:
   at least one of said connecting channels are filled with cured sealant to form a member selected from the group consisting of plugs and anchors.

6. The structure according to claim 3, wherein:
   at least one of said connecting channels are filled with cured sealant to form a member selected from the group consisting of plugs and anchors.

7. A microfluidic device structure, comprising:

a first, base ply provided with at least one microscale recess fabricated in an upper surface thereof, said at least one microscale recess at least partly defining a sealing channel;

at least one molded in situ member selected from the group consisting of a seal and a seal and channel lining, which is molded in situ in said sealing channel and projects above said upper surface of said base ply; and a secondary substrate having a lower surface in sealing contact with said at least one molded in situ member, said base ply and said secondary substrate defining sandwich layers, wherein said upper surface of said base ply is spaced apart from said lower surface of said secondary substrate, and wherein said at least one molded in situ member forms at least one containment surface and wherein said at least one molded in situ member and said lower surface of said secondary substrate together define and seal closed a microfluidicly active volume therebetween with microfluidic functionality which volume is in the form of at least one member selected from the group consisting of a fluid channel, a chamber portion, and a fluid channel and chamber portion.

* * * * *